United States Patent
Eskildsen et al.

(10) Patent No.: US 11,475,745 B2
(45) Date of Patent: Oct. 18, 2022

(54) SELF-CONTAINED SECURITY SYSTEM INCLUDING VOICE AND VIDEO CALLS VIA THE INTERNET

(71) Applicant: Ademco Inc., Golden Valley, MN (US)

(72) Inventors: Kenneth G. Eskildsen, Great Neck, NY (US); Robert E. Lee, Garden City, NY (US)

(73) Assignee: Ademco Inc., Golden Valley, MN (US)

( * ) Notice: Subject to any disclaimer, the term of this patent is extended or adjusted under 35 U.S.C. 154(b) by 649 days.

(21) Appl. No.: 15/000,813

(22) Filed: Jan. 19, 2016

(65) Prior Publication Data

US 2016/0133104 A1    May 12, 2016

Related U.S. Application Data

(63) Continuation of application No. 13/079,831, filed on Apr. 5, 2011, now abandoned.

(51) Int. Cl.
| | | |
|---|---|---|
| *G08B 13/196* | (2006.01) | |
| *G08B 25/08* | (2006.01) | |
| *G08B 25/01* | (2006.01) | |
| *H04M 11/04* | (2006.01) | |
| *G06F 3/048* | (2013.01) | |
| *H04L 65/1069* | (2022.01) | |
| *H04N 7/18* | (2006.01) | |
| *G08B 25/10* | (2006.01) | |
| *G08B 25/14* | (2006.01) | |

(52) U.S. Cl.
CPC ....... *G08B 13/19695* (2013.01); *G06F 3/048* (2013.01); *G08B 13/19697* (2013.01); *G08B 25/014* (2013.01); *G08B 25/08* (2013.01); *H04L 65/1069* (2013.01); *H04M 11/04* (2013.01); *H04N 7/183* (2013.01); *G08B 25/10* (2013.01); *G08B 25/14* (2013.01)

(58) Field of Classification Search
CPC .......... H04L 12/1895; H04L 29/06027; H04L 65/1006; H04L 43/0811; H04L 43/081; G08B 25/08; G08B 13/19697
See application file for complete search history.

(56) References Cited

U.S. PATENT DOCUMENTS

| | | | |
|---|---|---|---|
| 8,294,574 B2 * | 10/2012 | Haywood | G08B 13/19658 340/540 |
| 2003/0071724 A1 * | 4/2003 | D'Amico | G08B 25/008 340/506 |

(Continued)

*Primary Examiner* — Melanie Jagannathan
(74) *Attorney, Agent, or Firm* — Fredrikson & Byron, P.A.

(57) ABSTRACT

A security system is provided. The security system includes a control panel located within a secured space, a plurality of sensors coupled to the control panel that detect security events within the secured space, a user interface within the secured area coupled to the control panel, a camera located in the user interface that collects video images in the secured space surrounding the user interface upon activation of one of the plurality of sensors, a sound transducer located in the user interface, a programmed processor within one of the user interface and the control panel that supports VoIP calls between a called or calling party and the user interface and a control button on the user interface that activates a VoIP connection with a called or calling party through the user interface and control panel.

15 Claims, 1 Drawing Sheet

(56) References Cited

U.S. PATENT DOCUMENTS

| | | | |
|---|---|---|---|
| 2004/0086093 A1* | 5/2004 | Schranz | H04L 12/1895 379/37 |
| 2004/0113770 A1* | 6/2004 | Falk | G08B 13/19645 340/531 |
| 2005/0248453 A1* | 11/2005 | Fechter | G08B 13/19621 340/539.15 |
| 2006/0092010 A1 | 5/2006 | Simon et al. | |
| 2006/0181402 A1* | 8/2006 | Martin | G08B 13/19608 340/506 |
| 2006/0209857 A1 | 9/2006 | Hicks, III | |
| 2007/0298772 A1* | 12/2007 | Owens | G08B 13/19658 455/414.1 |
| 2008/0048861 A1 | 2/2008 | Naidoo et al. | |
| 2008/0129498 A1* | 6/2008 | Howarter | G08B 3/10 340/541 |
| 2009/0017751 A1 | 1/2009 | Blum | |
| 2009/0036159 A1 | 2/2009 | Chen | |
| 2009/0096602 A1 | 4/2009 | Reyes et al. | |
| 2009/0167862 A1* | 7/2009 | Jentoft | G08B 13/19641 348/143 |
| 2010/0195810 A1* | 8/2010 | Mota | H04N 7/186 379/167.12 |
| 2010/0277585 A1* | 11/2010 | Dasai | G08B 13/19697 348/143 |
| 2012/0310415 A1* | 12/2012 | Raestik | G05B 19/409 700/275 |

\* cited by examiner

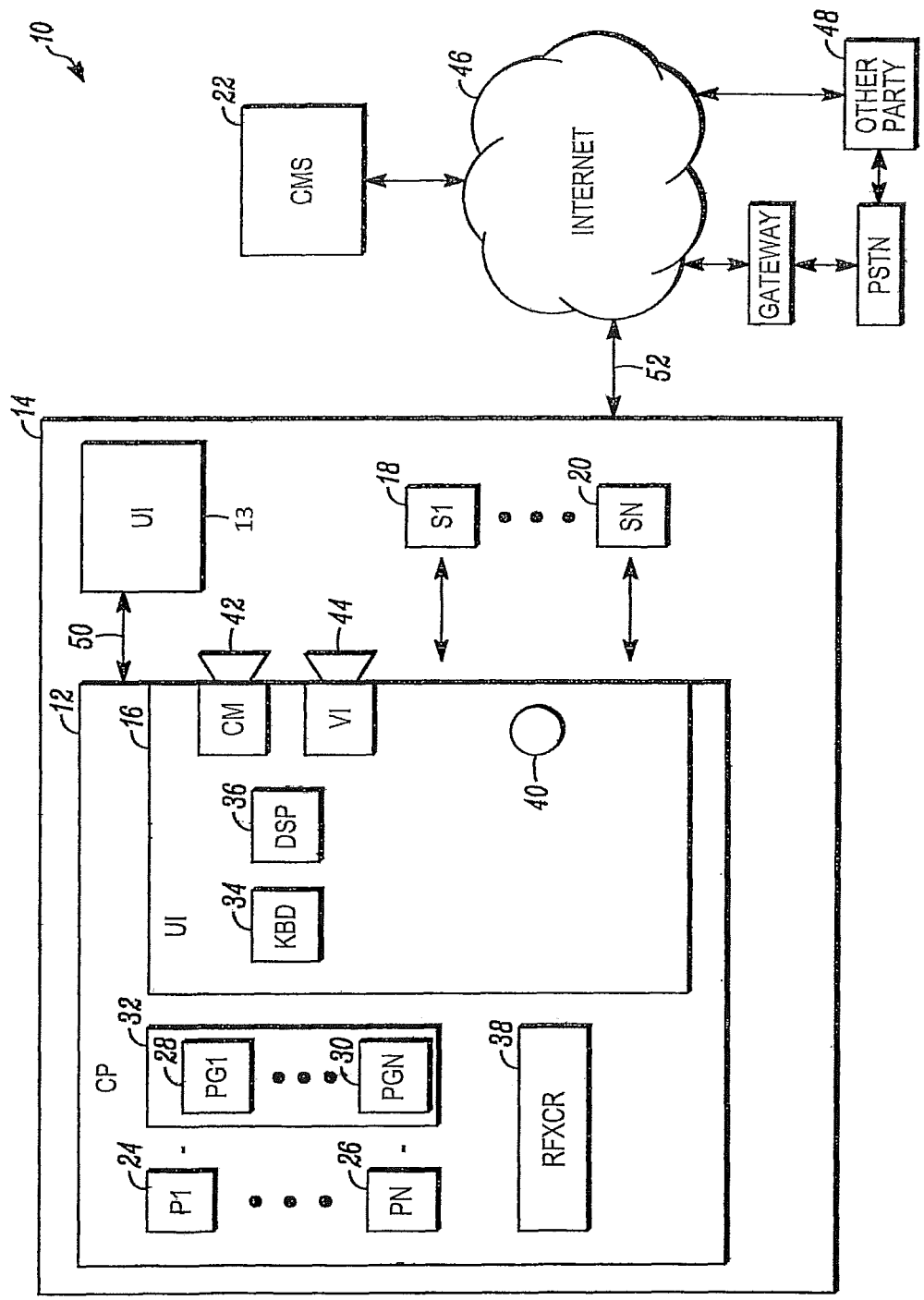

SELF-CONTAINED SECURITY SYSTEM INCLUDING VOICE AND VIDEO CALLS VIA THE INTERNET

CROSS-REFERENCE TO RELATED APPLICATIONS

This application is a continuation of and claims the benefit of the filing date of U.S. application Ser. No. 13/079,831 filed Apr. 5, 2011.

FIELD

The field relates to security systems and more particularly to communication through security systems.

BACKGROUND

Security systems for homes are generally known. Such systems are typically based upon the use of a number of intrusion sensors distributed throughout the home that are, in turn, connected to a control panel.

The control panel monitors the sensors for activation and upon detecting activation of one of the sensors, activates a local audible alarm. The control panel may also transmit an alarm message to a central monitoring station.

Associated with the control panel may be a keypad or touchpad and display (user interface) used to control the functionality of the control panel. In this regard, a controller within the security panel monitors the touchpad for arm and disarm commands and displays a status indicator on the display. In this regard, a user may be required to enter a password or other identifier in order change the status of the system.

In the event of a change in status, the controller will access a local connection to a public communication network and send the message to a central monitoring station. The message (e.g., an alarm message) would include a communication system identifier of the central monitoring station as well as an identifier of the security system. An identifier of the sensor or zone from which the alarm originated is also typically included within the alarm message.

While the controllers of some security systems communicate with central monitoring stations through plain old telephone service (POTS) lines, other newer systems are connected through the Internet. Because of the importance of such systems, a need exists for added flexibility in the way user interfaces are used.

BRIEF DESCRIPTION OF THE DRAWING

FIG. 1 is a simplified block diagram of a security system shown generally in accordance with an illustrated embodiment.

DETAILED DESCRIPTION OF AN ILLUSTRATED EMBODIMENT

FIG. 1 is a simplified block diagram of an alarm system 10 shown generally in accordance with an illustrated embodiment. Included within the security system 10 may be a control panel 12 coupled to a number of intrusion sensors 18, 20 within a secured area (e.g., a home) 14. The intrusion sensors 18, 20 may be any of a number of different types of devices (e.g., door or window switches, PIR motion detectors, video motion detectors, etc.) that detect intruders.

The control panel 12 may be portable with a user interface 16 built into a housing of the control panel 12. Alternatively, the control panel 12 may be stationary (i.e., fixed in location by screws, bolts, etc.) and coupled to a portable user interface 13.

In use, the control panel 12 may monitor the intrusion detectors 18, 20 for activation by an intruder. In the event of activation by an intruder, the control panel 12 may compose and send an alarm message to a central monitoring station 22. The central monitoring station 22 may respond to the alarm message by dispatching the police to the home 14.

Included within the control panel 12 may be a number of processors 24, 26 programmed with one or more software programs 28, 30 loaded from a non-transitory computer readable medium (memory) 32. It should be noted in this regard that reference made below to any step or operation performed by the security system 10 also refers to the respective programmed processor 24, 26 that performed that step or operation.

Included within each of the user interfaces 13, 16 may be a keypad (touchpad) or keyboard 34 and a display 36. While shown separately in FIG. 1, the keyboard 34 and display 36 may be combined into a single interactive display device.

The display 36 may be used to display to a user (homeowner), the current status of the security system 10. In the event of an alarm, the display 36 may also an identifier of any activated sensors 18, 20.

The keyboard 34 may be used by the homeowner to arm and disarm the system 10. In this regard, a status processor 24, 26 within the panel 12 may monitor the keyboard 34 for information from the user. If the user should enter a personal identification number (PIN) and activate a button labeled "ARMED AWAY", then the system 10 may enter an armed state. Similarly, if the user should enter a personal identification number (PIN) and activate a button labeled "ALARM OFF", then the system 10 may enter a disarmed state.

The control panel 12 may be coupled to the intrusion sensors 18, 20 and to the central monitoring station 22 via either a wired or wireless connection. If connected wirelessly, the control panel 12 may be provided with a radio frequency (RF) transceiver (e.g., WiFi, a GSM transceiver, etc.) 38 to provide complete portability within the secured area 14. In this regard, the RF transceiver 38 may operate under a first transmission format (e.g., Bluetooth) to communicate with the intrusion sensors 18, 20 and a second transmission format (e.g., a control channel of a local cellular base station) to communicate with the central monitoring station 22 through the Internet 46.

The control panel 12 may also be coupled to the intrusion sensors 18, 20 via a wired connection to provide a tethered portability within the secured area 14. In this case, the control panel 12 and intrusion sensors 18, 20 may each plug into and exchange messages via a home communication system (e.g., the Ethernet, VPLEX, twisted pair of wires, etc.) via an appropriate plug and socket arrangement (e.g., RJ45 plugs and receptacles). As above, the control panel 12 may communicate with the central monitoring station through the local communication system, a broadband connection 52 and the Internet 46.

Where the control panel 12 is portable, the control panel 12 is provided with the capability of establishing a voice and video or simply a voice connection with virtually any other party 48 having an Internet connection or who is connected to the public switch telephone network (PSTN). In this regard, the control panel 12 is provided with a VoIP processor 24, 26 controlled through the user interface 16 physically located on the housing of the control panel 12. In this regard, one or more externally accessible VOICE/ VIDEO CALL pushbuttons 40 is provided on the control panel 12 that may be activated to make or receive voice or video calls.

A video camera 42 is also provided that captures images in the secured area 14 directly adjacent the touch pad 16. Similarly, a voice transducer (e.g., a microphone and speaker combination) 44 is provided for exchanging sound between the user and the other party.

To make a voice call, the homeowner may simply activate the VOICE CALL pushbutton 40 and enter a destination (called party) telephone number through the keyboard 34. The VoIP processor 24, 26 may detect activation of the VOICE CALL pushbutton 40, receive the telephone number from the keyboard 34 and proceed to set up a voice connection with the other party 48 using an appropriate Internet VoIP resource (e.g., AOL, YAHOO, GOOGLE, SKYPE, etc.).

Once the voice connection has been set up, the user may converse with the other party 48 in a conventional manner. At the end of the conversation, the user may simply activate the pushbutton 40 a second time to terminate the connection.

Incoming voice calls may be handled in a similar manner. In this case, the user simply registers his/her system identifier (e.g., telephone number, IP address, etc.) with the Internet VoIP resource and calls are routed appropriately. As VoIP calls arrive through the panel 12, the user simply activates the pushbutton 40 to accept calls. The main advantage of this feature is that a user doesn't have to be at their PC.

A video and voice connection may be established in a similar manner. In this case, the user may activate a VOICE AND VIDEO pushbutton 40 and enter a destination identifier (e.g., IP address, telephone number, etc.) of the other party 48 through the keyboard 34. A voice and video processor 24, 26 may detect activation of the pushbutton 40 and destination identifier and set up the voice and video connection in a known manner. Once established, the voice and video connection may also operate in a conventional manner. Incoming voice and video calls may be handled in a conventional manner. At the end of the voice and video call, the user may simply activate the pushbutton 40 to terminate the connection.

The ability of the control panel 12 to establish VoIP or voice and video connections with other parties 48 offers functionality not available by simply combining a voice and video conferencing device with a security system. For example, the availability of the camera 42 and voice transducer 44 within the portable control panel 12 also allows an alarm processor 24, 26 to activate the camera 42 and to record video directly proximate the control panel 12 in cases where the system 10 is armed and an intrusion sensor 18, 20 indicates to an alarm processor 24, 26 that an intruder is present within the secured area 14. This allows images of the intruder to be captured and saved in memory 32 for later analysis or sent to the central monitoring station 22 in real time as the intrusion is occurring. Alternatively, the camera 42 may be used by the central station in the event of an alarm to verify that a person in the secured area 14 is an authorized user or homeowner. In this case, the central station 22 may be provided with a pushbutton (similar to the pushbutton 40) that activates a voice and video connection between the secured area 14 and central station 22.

Moreover, the camera 42 and voice transducer 44 on the portable control panel 12 allows a situation to be evaluated in cases where an ambush alarm on the keyboard 34 of the security system 10 is activated. In this case, personnel at the central monitoring station 22 may activate the camera 42 and/or voice transducer 44 via a monitoring processor 24, 26 based upon instructions sent from the central monitoring station 22. This ability allows security personnel to use the user interface 16 as an intercom, to identify hostage situations within the home 14 or otherwise identify a situation where the alarm has been activated accidentally (e.g., by children playing with keyboard 34). Other situations may include recognizing that one of the people present has a knife (hostage situation), that all the faces are unfamiliar (probable intruders), or that the faces are familiar (match photo in database). When the faces are familiar, security personnel at the central station 22 may assume that the alarm has been activated inadvertently and take less aggressive steps (e.g., call or send a message to the homeowner notifying the homeowner of the activation).

In an alternate embodiment, a non-portable control panel 12 may be provided where the control panel 12 is located in some secure space (e.g., a closet or basement) and where the security system 10 is controlled via a portable user interface 13. The non-portable control panel 12 may be fixed or otherwise attached within the secure space by some appropriate mechanism (e.g., screws, bolts, locks, etc.). In this embodiment, the user interface 13 includes the touchpad 34, the display 36, the camera 42 and the voice transducer 44. This may be important in order to prevent an intruder from disabling the security system 10 by destroying the control panel 12.

In this case, the portable user interface 13 may include a wired or wireless connection to the control panel 12. Similar to the portable control panel 12 (discussed above), the portable user interface 13 may be coupled to the control panel 12 via a wireless link 50 using wireless transceiver 38 (e.g., Bluetooth, WiFi, etc.) or if wired via a plug and connector arrangement (e.g., RJ45 connectors). The portable interface 13, in other aspects, may operate in a similar manner to the portable control panel 12.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   a portable user interface device forming a wireless connection with a security system control panel;
   the portable user interface device receiving first user input;
   responsive to the first user input, the portable user interface device instructing the security system control panel to establish a voice connection, a video connection, or a voice and video connection with a party via the Internet; and
   responsive to the security system control panel establishing the video connection or the voice and video connection and receiving a message from an intrusion sensor indicative of activation of the intrusion sensor, the portable user interface device activating a camera included within the portable user interface device to capture one or more images of a region located near the portable user interface device.

2. The method of claim 1 wherein receiving the first user input includes receiving an identification number of the party.

3. The method of claim 1 further comprising:
the portable user interface device transmitting the one or more images to the security system control panel.

4. The method of claim 1 further comprising the portable user interface device receiving second user input to establish the video connection or the voice and video connection.

5. The method of claim 1 further comprising:
the portable user interface device activating the camera for capturing the one or more images responsive to the security system control panel receiving an incoming call from the party via the Internet.

6. The method of claim 1 further comprising:
a voice transducer of the portable user interface device capturing one or more sound recordings in the region; and
the portable user interface device transmitting the one or more sound recordings to the security system control panel.

7. The method of claim 6 further comprising the portable user interface device activating the voice transducer for capturing the one or more sound recordings.

8. The method of claim 6 further comprising:
the portable user interface device activating the voice transducer for capturing the one or more sound recordings responsive to the security system control panel receiving an incoming call from the party via the Internet.

9. The method of claim 1 further comprising:
the portable user interface device receiving second user input; and
responsive to the second user input, the portable user interface device instructing the security system control panel to terminate the voice connection, the video connection, or the voice and video connection with the party via the Internet.

10. A method comprising:
a security system control panel forming a wireless connection with a portable user interface device;
the security system control panel receiving a message from an intrusion sensor indicative of activation of the intrusion sensor;
the security system control panel transmitting the message to a central monitoring station;
the security system control panel establish establishing a voice connection, a video connection, or a voice and video connection with the central monitoring station via the Internet; and
responsive to the security system control panel establishing the video connection or the voice and video connection, the security system control panel instructing the portable user interface device to activate a camera included within the portable user interface device to capture one or more images of a region located near the portable user interface device.

11. A system comprising:
a security system control panel; and
a portable user interface device,
wherein the security system control panels forms a wireless connection with the portable user interface device;
wherein the portable user interface device receives user input and transmits the first user input to the security system control panel,
wherein, responsive to the first user input and receiving a message from an intrusion sensor indicative of activation of the intrusion sensor, the security system control panel establishes a voice connection, a video connection, or a voice and video connection with a party via the Internet, and
wherein, responsive to establishing the video connection or the voice and video connection and receiving the message, the security system control panel instructs the portable user interface device to activate a camera included within the portable user interface device to capture one or more images of an ambient region.

12. The system of claim 11 further comprising:
a voice transducer included within the portable user interface device,
wherein the voice transducer captures one or more sound recordings in the ambient region,
wherein the portable user interface device transmits the one or more images or the one or more sound recordings to the security system control panel, and
wherein the security system control panel transmits the one or more images or the one or more sound recordings to the party, via the Internet and via the voice connection, the video connection, or the voice and video connection.

13. The system of claim 12 wherein the security system control panel or the portable user interface device activates the camera or the voice transducer for capturing the one or more images or the one or more sound recordings in response to an incoming call from the party via the Internet.

14. The system of claim 12 wherein the portable user interface device activates the camera or the voice transducer for capturing the one or more images or the one or more sound recordings responsive to the security system control panel receiving the message.

15. The system of claim 11 wherein the portable user interface device receives second user input, and wherein, responsive to the second user input, the security system control panel terminates the voice connection, the video connection, or the voice and video connection with the party via the Internet.

* * * * *